July 6, 1943.  W. D. SANGSTER ET AL  2,323,681
CONTROL FOR DISPENSING DEVICES
Filed May 13, 1940  2 Sheets-Sheet 1

INVENTORS.
Weston D. Sangster,
BY Joseph T. Bindner.
Chas. E. Townsend.
ATTORNEY.

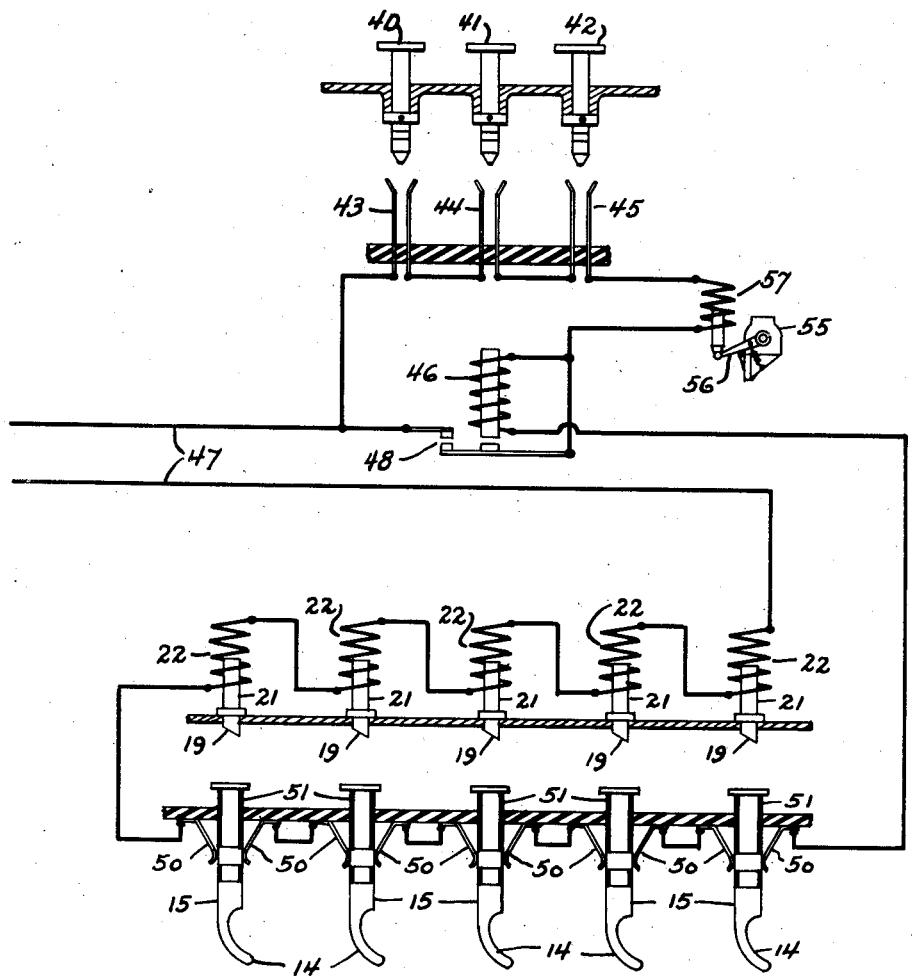

Patented July 6, 1943

2,323,681

UNITED STATES PATENT OFFICE 2,323,681

CONTROL FOR DISPENSING DEVICES

Weston D. Sangster and Joseph T. Bindner, Oakland, Calif.

Application May 13, 1940, Serial No. 334,850

8 Claims. (Cl. 312—35)

The present invention relates to controls for dispensing devices, and particularly to means for controlling dispensing devices from a station remote from the device, and preferably operable in conjunction with a cash registering device in such a manner that an accurate check of cash received may be made against the volume of merchandise dispensed.

Coin controlled devices for dispensing merchandise such as cigarettes, candy, or other articles contained in packages of uniform size, are at present in common use. There is, however, considerable loss due to the use of slugs or spurious coins in the operation of such devices. There are other disadvantages which accompany their use, such, for example, as the necessity of having exact change, or coins of the proper denomination, in order to operate the machines. On the other hand, the storing of merchandise on open shelves, to be sold by clerks who accept cash for the merchandise, is unsatisfactory in that the percentage of loss by pilfering, both of cash and merchandise, is very high, and can be checked upon only by costly and time consuming inventories made at frequent intervals.

The present invention is directed to the correction of the evils of both methods of sales above mentioned, and comprises means for controlling the operation of merchandise dispensing devices from a central station, and means for keeping an accurate check of cash received against merchandise dispensed.

It is the object of the invention to provide means associated with a cash register for controlling the operation of dispensing devices.

A further object is to provide such means to permit dispensing operations only upon registration on the cash register of the cost of the article to be dispensed, and further, to provide means for registering the quantity of articles dispensed in such a manner that the quantity may be checked with cash received.

A still further object is to provide in combination with a merchandise dispensing device means for locking the device against dispensing operation, and releasable only upon registration of a sum of money equal to the cost of the article to be dispensed.

The invention generally comprises a dispensing device or plurality of such devices similar to the conventional coin actuated devices used for the dispensing of cigarettes and the like, positioned for convenient access by patrons. A cash register is provided for operation by a cashier employed by the merchant owning the dispensing devices, and operation of the cash register controls the dispensing devices through electric circuits interconnecting the two. Consequently, a patron wishing to purchase an article contained by the vending device pays the cashier and names the article. The cashier upon depositing the cash received actuates the usual cash register keys to effect registration of the sum received, and actuates another key representing the type of merchandise to be sold. The combined actuation of all these keys effects closing of an electric circuit which is employed to unlock the particular dispensing device which contains said merchandise, making it possible for the patron to help himself.

By reason of this procedure, the cashier has an opportunity to inspect all coins received, thus eliminating the use of spurious coins, and no article may be dispensed without registration of its cost in the cash register.

Other objects and advantages of the invention will be set forth in the specification, wherein reference is made to the accompanying drawings. The drawings, which are more or less diagrammatic for the purpose of illustration, disclose the invention as it might be used in connection with a cigarette vending machine. Neither the drawings nor the specification, however, are to be taken as limiting the invention to any particular type of merchandise, nor to any specific dispensing mechanism, as the invention, as will be apparent from the specification, is adaptable to any merchandise which may be dispensed in any type of dispensing mechanism.

In the drawings—

Fig. 3 is a diagrammatic view illustrating the electric circuits by means of which the machine illustrated in Figs. 1 and 2 is connected with and controlled by the keyboard of a conventional cash register.

Figure 1:
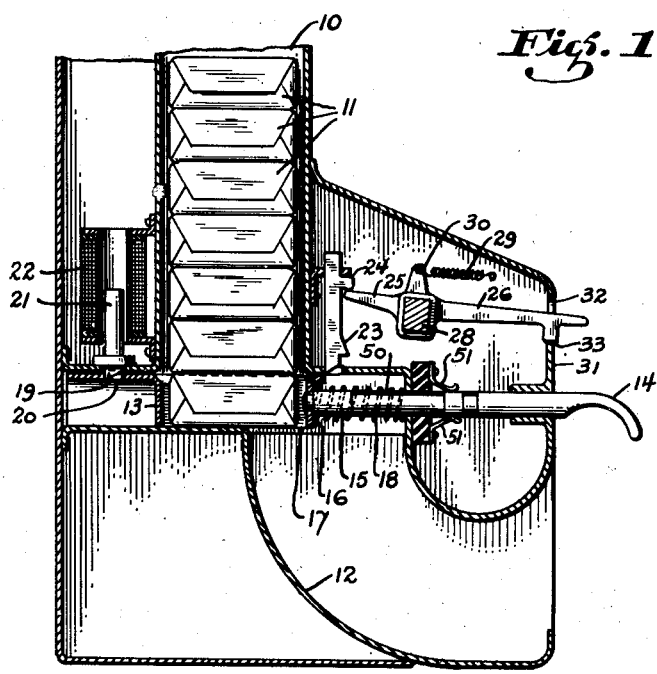
Fig. 1 is a vertical sectional view taken through a portion of a dispensing machine adapted to dispense cigarettes or similarly packaged articles, illustrating the application of the present invention to said machine.
Figure 2:
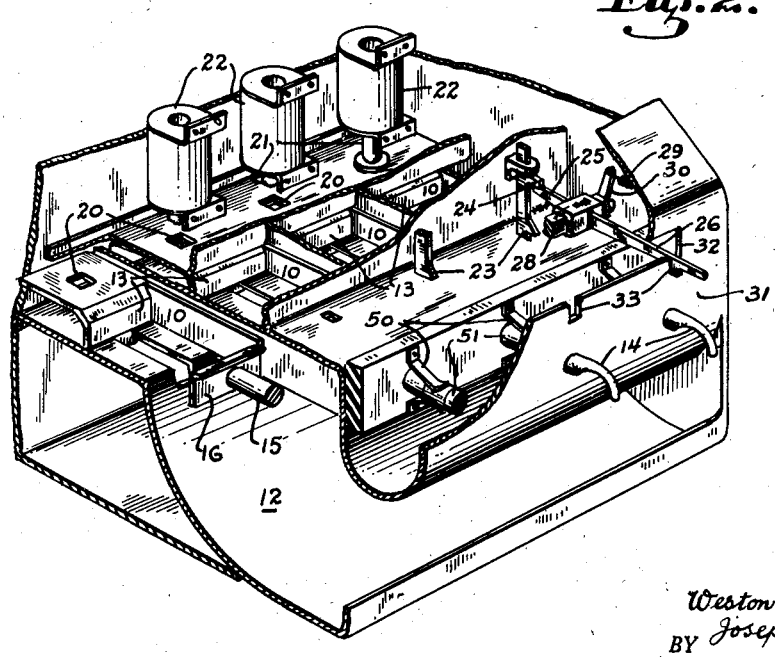
Fig. 2 is a perspective view of a portion of the machine illustrated in Fig. 1, with parts broken away to disclose the operating mechanism.

Referring to the drawings, in Figs. 1 and 2 portions of a dispensing device are illustrated as having the conventional vertical compartments 10 in which may be stored stacks of articles, such as packages 11 of cigarettes or the like. At its lower end each of the compartments 10 is left open forwardly to communicate with a delivery chute 12. An ejector member 13 is normally disposed rearwardly of the lowermost article in the compartment 10, and is arranged for forward sliding movement to remove the article from the compartment and cause it to fall into the delivery chute 12, and the shape of the ejector member 13 is such that upon being moved forwardly to eject the lowermost of the articles 11, it will underlie and prevent downward movement of the remainder of the articles in the stack until it has been returned to its normal position. The ejector may be moved forwardly through the medium of a handle 14 which extends through the front face of the dispensing device and which is connected with the ejector by means of a rod 15, a front plate 16, and a side plate 17, which forms a rigid connection between the front plate 16 and the ejector member 13. In order to dispense one of the articles 11, it is therefore necessary to pull outwardly upon the handle 14. The handle must be returned to its normal position before the next dispensing operation, and it is preferred that a spring such as indicated at 18 may be provided to effect automatic return of the handle and the ejector member.

In order to lock the device against dispensing operations, a latch 19 is provided for each of the compartments 10 for engagement in a hole 20 formed in the top surface of the ejector member 13 so that this surface of the member acts as a latch plate. This latch may be held in its latched position by gravity, and in order that it may be raised to permit operation of the ejector member, it is formed as a part of a reciprocable core 21 of an armature 22. Consequently upon energization of the armature 22, the core 21 is drawn upwardly and the latch removed from the ejector 13 to permit operation thereof.

As there may be any number of compartments 10 containing articles which sell for the same price, it is preferable that the armatures which control the latches for all of these compartments be energized by the same circuit, and in order that an article may be dispensed from only one of the several compartments upon release of all of the latches, each of the compartments is controlled by a second latch operable selectively by a manually actuated latch release. One of the said second latches is illustrated at 23, and comprises a vertically reciprocable member with its lower or latching end normally disposed in front of the plate 16 which forms a part of the ejector mechanism, thereby preventing operation of said mechanism.

Each of the latches 23 has a forwardly projecting finger 24 engageable by the inner end 25 of a lever 26, the outer end of which projects through the forward end of the dispenser housing for manual operation. This lever is mounted for longitudinal sliding movement on a rectangular guide bar 28 which is pivoted at its ends to permit it to oscillate, and is normally swung forwardly by a spring 29 connected with a lever 30 which is fixed to one end of the guide bar 28.

The forward face 31 of the housing, illustrated in Fig. 2, is provided with an elongated horizontally disposed slot 32, the lower edge of which is notched as at 33 at spaced intervals in alignment with the latches 23. By sliding the lever 26 along the bar 28, it may be positioned over any one of the notches 33, where its inner end 25 will underlie the finger 24 on the corresponding latch 23. Upon release of the lever 26 the spring 29 will cause it to move into one of the notches 33 so that the inner end of the lever will effect release of the latch 23 associated with said notch and permit operation of the ejector with which that particular latch is associated. Consequently, when a cashier has depressed keys on a cash register which actuate switches to energize the solenoids 22, all of the latches 19 in one dispensing device, or all of the latches which control articles of the same price, are released, and the patron may, by sliding movement of the outer end of the lever 26, effect selection of the particular article desired; and by pulling out upon the handle 14 he may dispense to himself the article purchased.

In Fig. 3 of the drawings, there is illustrated a typical electric circuit by means of which the operation described above may be effected. In this figure, depressible keys 40, 41 and 42 are shown as typical of the usual keys of a cash register. Depression of these keys effects closing of switches illustrated at 43, 44 and 45 respectively. It is to be understood, however, that any type of switch may be used, and the switches may be either built into a specially designed cash register, or made as units adapted for attachment to conventional cash registers.

Assuming that the circuit shown is one to be used for a cigarette vending machine in which the price of each of several different brands of cigarettes contained is fifteen cents per package, the key 40 will preferably bear the legend "Cigarettes"; the key 41 will bear the numeral "10" and will be associated with the ten cent registering mechanism of the cash register; and the key 42 will bear the numeral "3" and will similarly be associated with the five cent registering mechanism, as is conventional practice in cash registers.

Consequently, upon depression of all three of the cash register keys 40, 41 and 42, the switches 43, 44 and 45 will be closed to effect energization of a holding relay 46 which is included in a main circuit 47. The holding relay 46 upon energization will close its switch 48, completing the main circuit which includes the latch release solenoids 22 releasing all of the latches 21 controlled thereby. This circuit also includes a plurality of switches formed by resilient fingers 50 which bear against opposite sides of the bars 15 by means of which the handles 14 are connected with the ejecting mechanism, as described in connection with Figs. 1 and 2.

Each of the bars 15 is provided with a dielectric sleeve 51 disposed just inwardly of the point of contact of the fingers 50 so that upon outward or ejecting movements of any one of the handles 14, the dielectric sleeve comes between the fingers 50 and breaks the circuit to the latch solenoids 22 and also to the holding switch relay 46. Consequently, upon return movement of the handle on the ejector mechanism under influence of the spring 18 the switch which includes the resilient fingers 50 is again closed but a circuit is not completed to the latch solenoids 22 because of the fact that the holding relay has been released. It is therefore possible, after the cashier has closed the switches corresponding to the type and price of the merchandise selected, for the patron to effect selection of one of the several brands of merchandise of the same price, and to dispense a single package thereof.

The amount of cash registered by the cash register will therefore check against the merchandise delivered from the dispensing devices, and in order to facilitate inventory of the merchandise dispensed, the invention contemplates the use of a counting device associated with the circuit just described for the purpose of registering the number of sales made through said circuit. This counting device is illustrated as a conventional mechanical counter 55, the actuating lever 56 of which is connected with a solenoid 57 which is energized upon closing of the switches controlled by closing of the switches 43, 44 and 45.

Separate circuits will be provided for the dispensing of goods in different price classes. Each circuit may be identical with the one described above with the exception that the main closing switches shown at 43, 44 and 45 will be controlled by cash registering keys appropriate for the price and description of the class of goods released by the circuit. For example, the circuit for cigarettes selling at ten cents per package will be controlled by a "cigarette" key and one "ten cent" key, while a circuit for gum selling at five cents will be closed upon depression of a "gum" and a "five cent" key.

While certain features of the invention have been described in more or less specific detail herein, it understood that the invention is not limited to this specific description, but that various changes may be resorted to within the scope of the appended claims.

Having thus described my invention, what I claim and desire to secure by Letters Patent is:

1. In combination with a device for dispensing merchandise and a cash registering device, means locking the dispensing device against dispensing operation, and means controlled by a registering operation of the cash registering device for releasing the dispensing device to dispense an article of the price registered.

2. In combination with a device for dispensing merchandise and a cash registering device, means normally locking the dispensing device against dispensing operation, means controlled by operation of the cash registering device to release the locking means as to a class of articles in the dispening device, and means to effect selection of one of said class to be dispensed.

3. In combination with a cash register and a dispensing device adapted to contain articles of different prices, means normally locking the dispensing device, and means controlled by operation of the cash register for releasing the locking means on all articles selling for the same sum upon registration of said sum on the cash register.

4. In combination with a cash register and a dispensing device adapted to contain articles of different prices, means normally locking the dispensing device, means controlled by operation of the cash register for releasing the locking means on all articles selling for the same sum upon registration of said sum on the cash register, and means to effect selective dispensing of one of said articles.

5. The combination with a cash register and dispensing device of means normally locking the dispensing device against operation, means including circuits controlled by operation of the cash register to release said locking means and to hold it in released position, and means effective upon a dispensing operation to effect locking of said locking means.

6. In combination with a dispensing device, a cash register, electrically controlled locking means on the dispensing device, and circuits including switches adapted to be operated by depression of keys on the cash register for controlling said locking means, said switches being arranged to complete a circuit to release the locking means by depression of cash register keys identified with the kind and price of articles to be dispensed.

7. In combination, a cash registering device, a normally locked device for dispensing articles of different values, and a single means operable to effect registration of a cash value on the registering device and unlocking of the dispensing device as to articles of corresponding value.

8. In combination, a cash registering device, a normally locked device for dispensing articles of different values, and a single set of keys operable to effect registration of different values on the registering device and to unlock the dispensing device only for articles of value corresponding to that which is registered.

WESTON D. SANGSTER.
JOSEPH T. BINDNER.